United States Patent
Lamminmäki et al.

(10) Patent No.: US 8,268,203 B2
(45) Date of Patent: *Sep. 18, 2012

(54) METHOD FOR PRODUCING MICROCRYSTALLINE TITANIUM OXIDE

(75) Inventors: Ralf-Johan Lamminmäki, Ulvila (FI); Johanna Niinimäki, Pori (FI)

(73) Assignee: Sachtleben Pigments Oy (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/003,112

(22) PCT Filed: Jun. 30, 2009

(86) PCT No.: PCT/FI2009/050587
§ 371 (c)(1), (2), (4) Date: Mar. 9, 2011

(87) PCT Pub. No.: WO2010/004086
PCT Pub. Date: Jan. 14, 2010

(65) Prior Publication Data
US 2011/0180769 A1 Jul. 28, 2011

(30) Foreign Application Priority Data
Jul. 7, 2008 (FI) .................... 20085707

(51) Int. Cl.
*F21V 9/04* (2006.01)
*F21V 9/06* (2006.01)
*G02B 5/22* (2006.01)
*G02B 5/26* (2006.01)
*C01G 23/047* (2006.01)

(52) U.S. Cl. ......... 252/588; 106/447; 423/610; 428/402

(58) Field of Classification Search ............... 252/520.1, 252/520.2, 588; 106/437, 438, 441, 442, 106/447; 423/610; 428/402, 403, 404; 501/134
See application file for complete search history.

(56) References Cited

U.S. PATENT DOCUMENTS

| | | | |
|---|---|---|---|
| 5,536,448 A | 7/1996 | Takahashi et al. | |
| 5,698,177 A | 12/1997 | Pratsinis et al. | |
| 2007/0173405 A1* | 7/2007 | Karvinen et al. | 502/350 |
| 2011/0192322 A1* | 8/2011 | Lamminmaki et al. | 106/447 |

FOREIGN PATENT DOCUMENTS

| | | |
|---|---|---|
| CA | 2623627 | 4/2007 |
| EP | 0444798 A2 | 9/1991 |
| EP | 1443023 A1 | 8/2004 |
| EP | 1514845 A1 | 3/2005 |
| EP | 1514846 A1 | 3/2005 |
| EP | 1930297 A1 | 6/2008 |
| FI | EP0444798 B1 * | 2/1991 |
| FI | 20085707 | 7/2008 |
| JP | EP1930297 A1 * | 6/2008 |
| WO | 2010004086 A2 | 1/2010 |

OTHER PUBLICATIONS

Yu-Hong Zhanga, Armin Reller, Investigation of mesoporous and microporous nanocrystalline silicon-doped titania, Materials Letters 57 (2003) 4108-4113, www.elsevier.com/locate/matlet.*
Cheng, Ping et al., "Preparation and characterization of silica-doped titania photocatalyst through sol-gel method" Materials Letters 57 (2003); pp. 2989-2994.
Abstract not available for EP0777443; abstract corresponds to WO9606569; 2 pages.
International Preliminary Report on Patentability for PCT/FI2009/050587; filed Jun. 30, 2009; Date of Mailing Nov. 11, 2010; 10 pages.
International Search Report and Written Opinion for PCT/FI2009/050587; date of mailing: Jan. 13, 2010; 15 pages.
Li, Yuanzhi et al. A novel method for preparation of nanocrystalline rutile TiO2 powders by liquid hydrolysis of TiCl4; J. Mater: Chem: (First Published: Apr. 3, 2002), 2002, pp. 1387-1390.
Reply to Written Opinion for PCT/FI20091050587, dated May 5, 2010; 9 pages.
Search Report for FI 20085707; undated, 1 pg.
Zhang, Yu-Hong et al. "Investigation fo mesoporous and microporous nanocrystalline silicon-doped titania", Material Letters 57 (2003) (Accepted Apr. 2, 2003); pp. 4108-4113.

* cited by examiner

*Primary Examiner* — Bijan Ahvazi
(74) *Attorney, Agent, or Firm* — Gearhart Law, LLC

(57) ABSTRACT

A method for producing microcrystalline titanium dioxide in the rutile form having a crystal size below 15 nm by an aqueous method, and a titanium dioxide product doped with silicon obtained by the method. The method generally includes adding a silicon containing compound during crystal formation to provide said titanium dioxide product with a small crystal size.

10 Claims, No Drawings

METHOD FOR PRODUCING MICROCRYSTALLINE TITANIUM OXIDE

Cross Reference To Related Applications

This is a U.S. national stage of application No. PCT/FI2009/05087, filed on 30 Jun. 2009, Priority under 35 U.S.C. §119(a) and 35 U.S.C. §365(b) is claimed from Finland Patent Application No. 20085707, filed 07 Jul. 2008, the disclosure of which is also incorporated herein by reference.

BACKGROUND OF THE INVENTION

The invention relates to a method for producing fine microcrystalline titanium dioxide in the rutile form, with a crystal size of less than 15 nm.

Typically, microcrystalline titanium dioxide refers to titanium dioxide, $TiO_2$, with crystal sizes 5 to 10 times smaller than those of pigmentary titanium dioxide. Typically, the crystal size of microcrystalline titanium dioxide is of the order of 10 to 100 nm, resulting in optical properties of high transmission of visible light. On the other hand, UV radiation is well filtered i.e. absorbed, and reflected by transparent titanium dioxide. Accordingly, microcrystalline titanium dioxide is used in various applications such as in sunscreens where UV protection and superior transparency are required. For these applications, the best results are attained with microcrystalline titanium dioxide in the rutile form. An advantage of the titanium dioxide crystals in the rutile form is the wider UV protection provided in comparison with the anatase form.

Microcrystalline titanium dioxide is produced by methods associated with particular challenges to attain a controlled small crystal size, narrow crystal size distribution, and a suitable crystalline form, and further to prevent the liability of the particles to agglomerate, and to improve the dispersibility thereof. Moreover, requirements for the production processes are typically economic efficiency, and use of ecologically acceptable materials and process steps.

There are various methods for producing microcrystalline titanium dioxide, such as gas phase methods and methods starting from aqueous precipitates. Typically in the gas phase methods, anatase is first formed in the crystallization process of titanium dioxide, since it is a thermodynamically more stable structural form in the initial stages of the crystal growth. This often results in greater specific surface area of titanium dioxide in the anatase form due to smaller crystals formed. This is especially true for in the gas phase reaction with a high reaction rate, that is, the shorter reaction time is not sufficient for actual crystal growth of the rutile form. With this method, crystals in the rutile form may be produced by elevating the reaction temperature sufficiently, the higher temperature making the rutile form thermodynamically more favourable. Crystal sizes being, however, strongly increased by such high reaction temperatures, sizes of 10 nm may no longer be attained.

U.S. Pat. No. 5,698,177 discloses a gas phase synthesis for the production of $TiO_2$ where dopants compatible with $TiCl_4$ to be volatilized are used for the modification of the physical properties of $TiO_2$. $SiCl_4$ is mentioned as a possible dopant enabling to maximize the amount of the anatase form and to minimize the particle size thereof, thus increasing the specific surface area of the final product. However, handling of $TiCl_4$ is extremely difficult. It is very reactive and liable to form chloro compounds in the gas phase. Moreover, purity requirements for the gas phase reaction are high since all impurities will enter the titanium dioxide crystal in the burning step. Control of the anatase phase and specific surface area thereof is presented in the document where the proportion of the rutile form remains below 17%.

EP Patent No. 1514846 discloses a gas phase synthesis carried out with plasma, using a $SiO_2$ precursor mainly for the prevention of agglomeration, thus reducing the amount of particles with excessive sizes and increasing the specific surface area.

A previous patent of the applicant, EP Patent No. 0444798, describes an aqueous process for the production of microcrystalline titanium oxide in the rutile form, having a crystal size of less than 100 nm. In the process, solid titanium dioxide hydrate is first treated with a base, preferably with aqueous sodium hydroxide to reach an alkaline pH. Thereafter, the precipitate treated with the base is acidified with hydrochloric acid having a final concentration adjusted between 8 and 25 g/l. The precipitate obtained by the base and acid treatments is neutralized, preferably to a pH of 4 to 6. With this process, titanium dioxide with the proportion of the rutile form of 99.5%, and a crystal size typically of the order of 25 nm is obtained, crystal sizes of even as low as 15 nm being obtained by suitable selection of the process parameters.

U.S. Pat. No. 5,536,448 discloses the production of dendrite or asteroidal $TiO_2$ by a liquid phase process. Base is added to an aqueous dispersion of titanium dioxide hydrate to adjust pH to a neutral value, followed by heating of the mixture to a temperature between 90 and 100° C. The product obtained is further dispersed in water and mixed with hydrochloric acid in a molar ratio of HCl to $TiO_2$ of 1-4:1. The dispersion is aged at 85 to 100° C. for several hours, giving rise to dendrite or asteroidal $TiO_2$ microparticles. These product particles may be coated for instance with silicon oxides or oxyhydrates by slurrying the titanium dioxide product in water and adding a water-soluble silicon salt to the solution thus obtained. The coating deposited on the surfaces of the titanium dioxide particles improves the dispersibility of the product, and the stability of the dispersion.

Microcrystalline titanium oxide may also be produced by thermal hydrolysis of titanium oxochloride as described for instance in Bekkerman, L. I.; Dobrovol'skii, I. P.; Ivakin, A. A. Effects of the composition of titanium(IV) solutions and precipitation conditions on the structure of the solid phase. Russ. J. Inorg. Chem. 1976, 21, 223-226, or by neutralization, e.g. by heating a mixture of titanium oxychloride and a solvent to 60° C., addition of NaOH and calcinating the product thus obtained, as disclosed in EP Patent No. 1443023. The drawback of these processes is typically the fact that the starting material for the oxychloride solution, titanium tetrachloride, is difficult to handle due to liability to vaporize, and further, due to necessary cooling during dilution. Moreover, the use of the method of this type is typically associated with corrosion problems, safety risks and relatively high production costs.

The object of the present invention is to provide microcrystalline titanium dioxide in the rutile form, having superior transmission of visual light and ability to inhibit UV radiation. Another object is to produce microcrystalline titanium dioxide in the rutile form by a safe and industrially feasible method.

BRIEF DESCRIPTION OF THE INVENTION

The invention provides a method for the production of microcrystalline titanium dioxide, and a product produced by the method.

The inventors have found that an extremely small crystal size of the titanium dioxide product formed is obtained by the addition of a silicon containing compound such as water glass to the method for producing a titanium dioxide product in the rutile form in an aqueous industrial process. Further, a final product having desired properties fulfilling the requirements for the applications is obtained by the optimal adjustment of the concentration of hydrochloric acid in a suitable stage of the method.

The product obtained is very transparent and provides a superior UV protection thus making it suitable as a UV screen component in the cosmetic industry, and in various varnishes used for coatings such as wood preservatives and the like. The product according to the invention is particularly suitable for applications requiring superior transparency in the range of visible light, combined with concomitant filtering of the UV range. For instance optical electronics such as LED lights may be mentioned as other suitable applications, for which the high refractive index and excellent transparency of the titanium dioxide in the rutile form are important features.

DETAILED DESCRIPTION OF THE INVENTION

In the method of the invention, a substance containing titanium is converted into a suitable form in a known manner to yield a starting material for titanium dioxide production. Said substance containing titanium may be ilmenite, enriched form thereof or another impure raw material of titanium dioxide allowing the production of starting material containing titanium. Said starting material for titanium dioxide is preferably produced from ilmenite. Preferably, said starting material for titanium dioxide substantially comprises titanium dioxide hydrate.

Said starting material for titanium dioxide is preferably a washed solid titanium dioxide hydrate precipitate obtained from ilmenite by a sulfate process. More preferably, it is produced from ilmenite, enriched form thereof or another impure raw material of titanium dioxide as described in EP Patent No. 0444798.

Said starting material for titanium dioxide may also be a titanium compound from any commercial process that may be precipitated or recrystallized, preferably titanium oxychloride. Most preferably, said titanium oxychloride is produced from sodium titanate.

The titanium dioxide product obtainable by the method of the invention is microcrystalline, preferably with a crystal size of less than 15 nm, more preferably less than 12 nm, most preferably less than 11 nm, according to the parameters selected for the production process, and influencing the crystal size.

Crystal size and crystal form of the microcrystalline titanium dioxide, preferably titanium dioxide in the rutile form, may be controlled by the method of the invention. In the titanium dioxide product, the proportion of the rutile crystal form is preferably more than 70%, more preferably more than 90%, most preferably more than 99%, such as 99.5%. Percentage of the rutile form is controlled according to the desired application by the combined addition of silicon and hydrochloric acid. In essence substantial addition of silicon and low hydrochloric acid concentration result in a rutile percentage of about 70%, while lower silicon addition and higher HCl concentration yield rutile percentages of more than 99.5%.

According to the first aspect of the invention, the microcrystalline titanium dioxide product is produced by an aqueous process. Preferably in this case, the process solution is mainly an aqueous mixture or a solution. More preferably, an aqueous slurry is used, also containing solid matter precipitating in various stages. In at least one step of the typically multistep process, a silicon containing compound is used to provide the titanium dioxide product with said small crystal size. The addition of said silicon containing compound inhibits the growth of crystals of titanium dioxide in the rutile form, thus resulting in the final microcrystalline titanium dioxide product.

According to the first preferable embodiment of the first aspect of the invention, the titanium dioxide starting material is first treated with a base to yield an alkaline pH value. In that case, the titanium dioxide starting material is slurried in water, thus giving a slurry having a consistency between 250 and 450 g/l. Said base is added to this slurry. Said base is preferably an aqueous solution of sodium hydroxide, the treatment being carried out at an elevated temperature. The concentration of the base is preferably adjusted to give the equivalence of about 300 to 350 g of NaOH/l of $H_2O$. The elevated temperature is preferably about 60° C. or above. The slurry is preferably agitated at this temperature for longer than an hour.

In case the titanium dioxide starting material is an intermediate of the sulfate process, such as titanium dioxide hydrate, said treatment with a base to give sodium titanate soluble in hydrochloric acid is preferably carried out at about 95° C. or higher, preferably for two hours. The treatment may be performed in an agitated reactor indirectly heated by steam. pH of the intermediate after the base treatment is preferably more than 11.

Titanium precipitate obtained after the base treatment is preferably washed while still hot, or with hot water, preferably with water of less than 60° C., and filtered. The object of the washing is to obtain a precipitate free of sulfate ions, thus enabling the examination of the washing result using the barium chloride test, as is known. Thereafter, the precipitate free from sulfates, and containing sodium is slurried in water to give a slurry having a concentration of titanium dioxide ranging between 100 and 250 g/l, preferably between 170 and 210 g/l.

A silicon containing compound is added to this precipitate treated with a base, or to the intermediate. Said silicon compound is preferably added as an aqueous solution, preferably at an elevated temperature, preferably at a temperature of above 50° C. while agitating. It is necessary for said silicon compound to be in a water-soluble form to distribute it as uniformly as possible as an adjuvant in the solution under treatment during crystallization of $TiO_2$. Homogeneity of the reactions taking place may thus be controlled, and accordingly, titanium dioxide product of very uniform quality is obtained. Silicon compounds are typically in a soluble form under alkaline conditions, and thus the pH of the solution should be more than 9.8.

Preferably, the silicon compound of the invention is substantially a water-soluble silicate, more preferably water glass. The term "water glass" refers to a concentrated solution of sodium silicates, substantially including sodium orthosilicate ($Na_4SiO_4$) and sodium metasilicate ($Na_2SiO_3$) (CAS-number 6834-92-0), readily soluble in water. The silicon compound to be added is preferably in the form of an aqueous solution. The concentration of the water glass solution to be added to the process is more than 60 g/l of $SiO_2$.

After the base treatment and the addition of the silicon containing compound, the precipitate or slurry thereof is treated with hydrochloric acid with the final concentration thereof being adjusted to the desired value ranging between 15 and 65 g/l, preferably 30 and 50 g/l, and more preferably between 30 and 40 g/l, according to the desired amount of the rutile form and economic requirements for the process. As the acid, concentrated hydrochloric acid (37% by weight) is preferably used. HCl concentration is controlled by titration, and readjusted if necessary. After the acid addition, the temperature of the slurry is preferably elevated to the range of 80 to 100° C., at which temperature the slurry is preferably boiled while agitating for 20 to 180 minutes. Addition time of hydrochloric acid depends on the batch size. The addition of silicon was found to reduce the crystal size, but on the other hand to favour the formation of the anatase form. This is compensated by adjusting the acid concentration to yield a final product containing a higher proportion of the rutile form.

Preferably, silicon containing compound may also be added after the acid treatment. In this case, silicon is found to prevent rutile formation and reduce photoactivity of titanium dioxide, that is, to improve its photostability, which is a desirable property for instance in cosmetic applications. On the other hand, the anatase form is considered to be more preferable e.g. for the production of a superior and effective photocatalyst with a high photoactivity and low photostability. The result is thus a titanium dioxide product with improved quality and higher resistance. Moreover, the washed product may still be heated in a furnace to a high temperature without growth of the crystal size of titanium dioxide. This thermal treatment may substantially reduce the specific surface area, and improve the thermal stability of the final product. As is known, dispersion properties of products are substantially increased by lower specific surface areas. Better heat stability, meaning that no physical or chemical changes occur in the product as the temperature rises, is a preferable property for instance in various catalytic applications where temperatures are high. Small crystal size of titanium dioxide is an advantage in such cases.

Silicon containing compound may also be added to the washed product, that is in the "coating step" where the properties of titanium dioxide may be adjusted to make them more suitable for various application as is known. For instance, photostability and dispersibility of titanium dioxide may be adjusted in this way.

The slurry is neutralized after the base treatment, addition of the silicon containing compound, or any further additions, and after the acid treatment. Neutralization in preferably performed with sodium hydroxide. Concentration of the sodium hydroxide solution is typically at least 200 g/l, preferably between 200 and 400 g/l. In this context, the term neutral refers to a pH value between 4 and 6, preferably between 5 and 6. Neutralized slurry is preferably mixed for 10 to 60 minutes, according to the amount thereof. The added silicon is caused to adhere on the titanium dioxide being formed by the neutralization.

After neutralization, the precipitate, that is, the finished titanium dioxide product, is filtered, washed with water and dried in a manner known per se, preferably at 95 to 110° C. This product may be further processed in a known manner, such as by calcination.

Prior to the acid treatment, the amount of the silicon compound to be added according to the invention is preferably between 0.5 and 10% by weight, preferably between 2 and 3%, most preferably between 2 and 2.5%, expressed as $SiO_2$ and on the basis of $TiO_2$. It may be found that silicon is almost completely incorporated in the final product, that is, the amount of silicon in the final product corresponds to that added to the production process. In case the silicon treatment step is performed after the acid treatment, the amount to be added in this step is preferably less than 40%, preferably 2 to 39%, preferably 10 to 30%, by weight, expressed as $SiO_2$ and on the basis of $TiO_2$.

According to the second embodiment of the first aspect of the invention, a basic solution, preferably a sodium hydroxide solution, is prepared, and added with a silicon compound. To this mixture, titanium dioxide starting material is further added, said material being preferably substantially titanium oxychloride, more preferably an aqueous solution thereof. pH of the mixture is adjusted to range between 4 and 7 with a base, followed by filtration and drying of the precipitate formed, that is, the titanium dioxide product.

Concentration of the basic solution, preferably the sodium hydroxide solution, may for instance range from 200 to 400 g/l. The basic solution may be heated, preferably to about 60° C. Prior to the adjustment of the pH, the mixture may be heated, preferably to a value below 90° C.

Titanium oxychloride is preferably a commercial titanium oxychloride solution with a Ti concentration ranging from 150 to 300 g/l, expressed as $TiO_2$. With the hydrochloric acid present in the titanium oxychloride solution, the hydrochloric acid concentration of the mixture may be elevated to a value between 20 and 25 g/l, at which the mixture may preferably be boiled for less than an hour prior to neutralization.

Preferably, the silicon containing compound is substantially a water-soluble silicate, preferably water glass. The silicon compound to be added is preferably in the form of an aqueous solution. More preferably, the concentration of the water glass solution to be added to the process is more than 60 g/l of $SiO_2$.

In this embodiment, the silicon containing compound is added to provide the final product with said compound, expressed as $SiO_2$, in an amount of 0.5 to 5%, preferably 1 to 2.5%, more preferably 1.5 to 2%, by weight, on the basis of $TiO_2$.

An advantage of this embodiment is that an even smaller crystal size is attained by a lower silicon addition than in the version described first, that is, the desired small crystal size is obtained more easily.

According to a second aspect of the present invention, a base solution, preferably a sodium hydroxide solution may be prepared. Titanium dioxide starting material, preferably substantially titanium oxychloride may be further added to said solution, preferably as an aqueous solution. The pH of the mixture is adjusted with a base to a value between 4 and 7, followed by filtration and drying of the precipitate, the titanium dioxide product, thus formed.

The concentration of the base solution used may for instance range from 300 to 800 g/l. The base solution may be heated, preferably to about 60° C. Prior to the pH adjustment, the mixture may be heated, preferably to a temperature below 90° C.

Titanium oxychloride is preferably a commercial titanium oxychloride solution with a Ti concentration ranging from 150 to 300 g/l, expressed as $TiO_2$. With the hydrochloric acid present in the titanium oxychloride solution, the hydrochloric acid concentration of the mixture may be elevated to a value between 20 and 25 g/l, at which the mixture may preferably be boiled for less than an hour prior to neutralization.

With this method, a microcrystalline titanium dioxide product having a crystal size of 10 nm is obtained, the proportion of rutile in the product being more than 70%, preferably more than 90%, most preferably more than 99%.

According to the third aspect of the invention, a microcrystalline titanium dioxide product is obtained by the methods described above, the crystal size of the product being reduced to a value below 15 nm. This product formed is preferably in the rutile form, having a rutile percentage of above 70%, preferably more than 90%, most preferably more than 99%. The product is characterized in that it depending on the production method, preferably contains high amounts of silicon in its structure, as part of the titanium dioxide product, and not conventionally, for instance as a $SiO_2$ coating deposited on the outer surface of the finished titanium dioxide product as is known. The amount of silicon in the structure is from 0.5 to 10%, preferably 2 to 3%, more preferably 2 to 2.5%, by weight, expressed as $SiO_2$ on the basis of $TiO_2$, prior to any coating treatment with a silicon compound.

The invention will now be illustrated with non-limiting examples.

EXAMPLES

Comparative Example 1

The production of titanium dioxide by sulfite method starts with a reaction of enriched ilmenite with sulfuric acid. The solid reaction cake formed was dissolved by means of water and acid wastes. Impurities were removed and iron sulfate was separated by crystallization. The solution containing the titanium was concentrated, and titanium dioxide hydrate was precipitated by hydrolysis. This precipitated mass was washed in several steps to be free of salts.

According to the document EP Patent No. 0444798, about 10 tons of this washed titanium dioxide hydrate precipitate mass, expressed as $TiO_2$, is provided and slurried in water to give a consistency of 300 to 400 g/l, 350 g/l being the desired value. The slurry thus obtained is made strongly basic to a pH value of above 11, by the addition of 15 tons of NaOH as an aqueous solution having a concentration of 700 g/l at 60° C. The temperature of the slurry is elevated to 95° C., followed by agitation of the mixture for two hours at this temperature. During this treatment, the titanium dioxide hydrate mass reacts with the alkali to yield solid sodium titanate, followed by removal of the sulfate ions by washing the slurry with hot water until no sulfates are found in the filtrate during barium chloride precipitation.

The sodium containing filtrate cake free of sulfates is slurried in water to give a slurry with a concentration, expressed as titanium dioxide, of about 180 g/l, followed by heating to 70° C. while constantly agitating. Thereafter, the acid content of the slurry is adjusted to the desired value, being in this case 25 g/l, by the addition of concentrated hydrochloric acid (37%, by weight). HCl concentration is controlled by titration, and readjusted if necessary. The temperature of the slurry is further elevated to 90° C., at which temperature the slurry is boiled for 120 min while agitating.

After the hydrochloric acid treatment, the slurry is allowed to cool to about 60° C., followed by neutralization with sodium hydroxide of 300 g/l, to a pH value of 5.5. The slurry is agitated for 30 minutes, followed by filtering, washing with water, and drying of the precipitate at 105° C. Percentage of rutile (R %), the mean crystal sizes of the rutile and anatase phases, and the $SiO_2$ content of the product are determined. The results obtained are presented in Table 1 below.

Examples 2 to 12

Titanium oxide and titanium oxyhydrate were prepared as described in Example 1, followed by the treatment of the titanium oxyhydrate with a base as described in Example 1, substantially in accordance with the document EP Patent No. 0444798.

Thereafter, the sodium containing filtrate cake free of sulfates was slurried in water to give a slurry with a concentration of about 180 g/l, expressed as titanium dioxide. The $SiO_2$ content of the slurry was adjusted to a desired value by the addition of water glass having a $SiO_2$ content of 63 g/l, the slurry being heated to 70° C. while constantly agitating. Desired amounts of water glass are presented in Table 1. In the examples 2 to 6, the addition of $SiO_2$ present in water glass was held constant, at 2% by weight based on $Tio_2$, whereas the hydrochloric acid concentration was varied between 25 and 55 g/l. The examples 7 to 9 were carried out with a 2.5% addition of $SiO_2$, while the concentration of hydrochloric acid was varied. The examples 10 to 12 were carried out with a 3% addition of $SiO_2$, respectively.

Thereafter, the acid concentration of the slurry was adjusted to the desired values presented in Table 1, by the addition of concentrated (37%, by weight) hydrochloric acid. HCl concentration was controlled by titration, and readjusted if necessary. The temperature of the slurry was further elevated to 90° C., at which the slurry was boiled for 120 min while agitating.

After the hydrochloric acid treatment, the slurry was allowed to cool to about 60° C., followed by neutralization with sodium hydroxide of 300 g/l, to a pH value of 5.5. The slurry was agitated for 30 minutes, followed by filtering, washing with water, and drying of the precipitate at 105° C. Percentage of rutile (R %), the mean crystal sizes of the rutile and anatase phases in the product are determined by X-ray diffraction (nm), $SiO_2$ content of the product being determined in weight percent relative to $TiO_2$.

The results obtained are presented in Table 1 below.

The results presented in Table 1 clearly show the influence of $SiO_2$ on the crystal size reduction, and that of the hydrochloric acid concentration on rutile formation, the percentages of rutile increasing with increasing hydrochloric acid concentrations.

The percentage of rutile, and crystal sizes of the phases were determined by the X-ray diffraction method in a known manner.

TABLE 1

|  | 1 | 2 | 3 | 4 | 5 | 6 | 7 | 8 | 9 | 10 | 11 | 12 |
|---|---|---|---|---|---|---|---|---|---|---|---|---|
| water glass added, calculated as % $SiO_2$ | 0 | 2 | 2 | 2 | 2 | 2 | 2.5 | 2.5 | 2.5 | 3 | 3 | 3 |
| HCl (g/l) | 25 | 25 | 35 | 45 | 50 | 55 | 45 | 55 | 65 | 45 | 55 | 65 |
| R % | >99.5 | 69.5 | 76 | 80 | >99.5 | 83 | 70 | 77.5 | >99.5 | 76 | 85.5 | 86.5 |
| Rutile (nm) | 15 | 13 | 10 | 9 | 8 | 8 | 9 | 8 | 8 | 8 | 8 | 7 |
| Anatase (nm) | 0 | 4 | 4 | 4 | 0 | 3 | 4 | 4 | 0 | 4 | 4 | 4 |
| $SiO_2$ content | 0.03 | 2.04 | 2.06 | 2.00 | 2.10 | 2.10 | 2.60 | 2.60 | 2.60 | 3.02 | 3.03 | 3.03 |

Examples 13 to 16

About 114 g of $TiO_2$ as a filter cake containing sodium, produced according to the example 1, was slurried in water to obtain a slurry with a concentration of about 186 g/l, calculated as titanium dioxide. Water glass with a $SiO_2$ content of 63 g/l was added to the slurry to give a $SiO_2$ concentration of 2.5% by weight, based on $TiO_2$. The slurry was heated to 70° C. while constantly stirring.

Thereafter, concentrated hydrochloric acid was added to the slurry during one minute to yield a hydrochloric acid concentration of about 65 g/l. The temperature of the slurry was further elevated to 90° C., at which the slurry was boiled for 120 min while stirring. After the hydrochloric acid treatment, the solution was allowed to cool to about 60° C.

The desired amount of $SiO_2$ was added in the form of water glass, followed by neutralization with sodium hydroxide to a pH value of 5.3. The slurry was stirred for 30 minutes, followed by filtering of the slurry and washing with water. The cake was dried in a rotary oven at 240° C. for 120 min, and calcined at 550° C. for 90 min. The sample from the example 13 was, however, not calcined.

The results are presented in Table 2.

TABLE 2

|  | 13 | 14 | 15 | 16 |
|---|---|---|---|---|
| water glass as $SiO_2$ [%] | 0 | 20% | 30% | 40% |
| R % | >99.5 | 70 | 69 | 66 |
| crystal size of rutile by X-ray diffraction, nm | 7 | 9 | 10 | 10 |
| $SiO_2$ (coating analysis) |  | 19.5 | 26.4 | 32.8 |

The results in Table 2 show that $SiO_2$ added after boiling with hydrochloric acid prevents rutile formation and crystal growth in subsequent treatment steps such as drying and calcination.

Example 17

5100 g of $TiO_2$ as a filter cake containing sodium produced according to example 1 were slurried in water to give a slurry with a titanium dioxide concentration of about 183 g/l.

Water glass containing 63 g/l of $SiO_2$ was added to the slurry to give a $SiO_2$ concentration of 2.2% by weight of $TiO_2$. The slurry was heated to 70° C. while constantly stirring. Thereafter, concentrated hydrochloric acid was added to the slurry during about 15 minutes to give a HCl concentration of 44.1 g/l. The temperature of the slurry was further elevated to 90° C., at which the slurry was boiled for 120 min while stirring. After the HCl treatment, the solution was allowed to cool to about 60° C. 15.9 litres of water glass was added, equivalent to 20% by weight of $SiO_2$, on the basis of $TiO_2$, followed by neutralizing with sodium hydroxide to give a pH of 5.5. The slurry was agitated for 30 minutes, followed by filtering of the precipitate, and washing with water (the amount of the wash water being about 10 times higher than that of titanium). The cake was slurried in water and spray dried (Gea Niro NS (id 092-1203-00)). The percentage of rutile measured from the product is above 99.5%, by weight, the average crystal size of rutile being 10 nm, and $SiO_2$ content being 11.08%.

Examples 18 and 19

Spray dried product prepared as described in example 17 was calcined in a rotary drum oven at 650° C., followed by slurrying the product to give a consistency of 400 g/l. The slurry was divided into two parts. To one part (example 18), glycerol was added in an amount of 20% by weight of $TiO_2$. The mixture was stirred for 45 minutes and spray dried. To the other part (example 19), glycerol was added in an amount of 13% by weight of $TiO_2$. The mixture was stirred for 45 minutes and spray dried.

Following parameters of the product were measured:

|  | 18 | 19 |
|---|---|---|
| Crystal size by X-ray diffraction [nm] | 10 | 10 |
| R [%] | >99.5 | >99.5 |
| BET [m²/g] | 91 | 88 |
| $Al_2O_3$ % | 0.10 | 0.22 |
| $SiO_2$ % | 10.55 | 10.51 |
| $P_2O_5$ % | 0.008 | 0.017 |

Specific surface area was measured as known by the BET method with nitrogen adsorption.

Example 20

5100 g of $TiO_2$ as a filter cake containing sodium produced according to example 1 was slurried in water to give a slurry with a titanium dioxide concentration of 203 g/l. Water glass containing 63 g/l of $SiO_2$ was added to the slurry to give a $SiO_2$ concentration of 2.2% by weight of $TiO_2$. The slurry was heated to 70° C. while constantly stirring. Thereafter, concentrated hydrochloric acid was added to the slurry during about 15 minutes to give a HCl concentration of 36 g/l. The temperature of the slurry was further elevated to 90° C., at which the slurry was boiled for 45 min while stirring. After the HCl treatment, the solution was allowed to cool to about 60° C. 19.5 litres of water glass is added, equivalent to 25% by weight of $SiO_2$, on the basis of $TiO_2$, during 30 minutes. The temperature was allowed to fall to a value not less than 75° C. After stirring for 45 minutes at 75° C., pH was elevated with sodium hydroxide to a value of 9.5. After further stirring for 45 minutes at 75° C., neuralization was performed with sulfuric acid (30% by weight) to give a value of 4.5. The slurry was stirred for 30 minutes, followed by pH control and adjustment if necessary. Cold distilled water was added to reduce the temperature to about 60° C. Adjustment of pH at 60° C. to a range between 4.5 and 4.7 if necessary. 5 ml of the slurry was taken, filtered and washed using a laboratory-scale Moore filtering device (suction filter). A small amount was dried at 105° C.

The following parameters of the product were analyzed:

| Soluble salts, µS/cm | 73 |
|---|---|
| Photostability | 29 |
| pH of the dried product | 6.8 |
| R % | 76.5 |
| Crystal size of rutile by X-ray diffraction, nm | 11 |
| Crystal size of anatase by X-ray diffraction, nm | 4 |
| $SiO_2$ (coating analysis) | 19.8 |

Example 21

Commercial titanium oxychloride (produced by Kronos) was used as the titanium source, with a Ti content of 205 g/l calculated as $TiO_2$, the HCl content being 321 g/l. With the HCl treatment, a HCl content of 20 to 25 g/l was aimed at.

0.800 liters of a sodium hydroxide solution with a concentration of 342 g/l was heated to 60° C. 4.5 ml of water glass with a $SiO_2$ content of 63 g/l was added. 1.068 liters of titanium oxychloride was added to the solution during 5 minutes. After stirring for 5 minutes, and heating to 80° C. at a rate of 1° C./min, the mixture was boiled at this temperature for 30 minutes, while constantly mixing. pH was adjusted with sodium hydroxide to a value of 6, and allowed to be mixed for 30 minutes. The precipitate was filtered and dried at 105° C.

R % of the product analysed is above 99.5% by weight, the crystal size of rutile being 5 nm.

Example 22

Commercial titanium oxychloride was used as the titanium source as in example 21, with a Ti content of 205 g/l calculated as $TiO_2$, the HCl content being 321 g/l. With the HCl treatment, a HCl content of 12 g/l was aimed at.

0.494 liters of a sodium hydroxide solution with a concentration of 760 g/l was heated to 60° C. 1.068 liters of titanium oxychloride were added to the solution during 5 minutes. After stirring for 5 minutes, and heating to 80° C. at a rate of 1° C./min, the mixture was boiled at this temperature for 30 minutes, while constantly mixing. The pH was adjusted with sodium hydroxide to a value of 6, and allowed to be mixed for 30 minutes. The precipitate was filtered and dried at 105° C. R % of the product analysed was above 99.5% by weight, the crystal size of rutile being 10 nm. Although the crystal size of the titanium dioxide produced in this manner was small, it may be further reduced by the addition of a silicon compound, such as water glass as in example 21, thus reducing the crystal size to half in comparison with the result obtained in this example.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for producing microcrystalline titanium dioxide in the rutile form having a crystal size below 15 nm by an aqueous process, the method comprising:
   a) treating a titanium dioxide starting material with a base to give an alkaline pH value to obtain a first intermediate precipitate;
   b) adding a silicon containing compound to the first intermediate precipitate having an alkaline pH, to obtain a second intermediate precipitate, wherein the silicon containing compound is added in an amount to give a final product with a content of silicon, calculated as $SiO_2$, ranging between 0.5% and 10% by weight of $TiO_2$;
   c) treating the second intermediate precipitate with hydrochloric acid adjusted to a final concentration ranging between 15 and 65 g/l, to obtain a precipitate of rutile $TiO_2$ in an acidic pH, and
   d) neutralizing the rutile $TiO_2$ precipitate obtained in step c) to a pH between 4 and 6.

2. The method according to claim 1, wherein the titanium dioxide starting material comprises titanium dioxide hydrate.

3. The method according to claim 1, wherein said silicon containing compound is added in an amount to give a final product with a content of said compound, calculated as $SiO_2$, ranging between 0.5 and 5% by weight of $TiO_2$.

4. The method according to claim 1, wherein in step c), the final concentration of hydrochloric acid is adjusted to be between 25 and 55 g/l.

5. The method of claim 1, wherein said silicon compound comprises a water-soluble silicate.

6. The method according to claim 1, wherein said silicon containing compound is added in an amount to give a final product with a content of said compound, calculated as $SiO_2$, ranging between 2 and 3% by weight of $TiO_2$.

7. The method according to claim 1, wherein said silicon containing compound is added in an amount to give a final product with a content of said compound, calculated as $SiO_2$, ranging between 2 and 2.5% by weight of $TiO_2$.

8. A method for producing microcrystalline titanium dioxide in rutile form having a crystal size below 15 nm by an aqueous process, the method comprising:
   a) providing a basic solution and adding a silicon containing compound to the basic solution in an amount to give a final product with a content of said compound, calculated as $SiO_2$, ranging between 0.5 and 10% by weight of $TiO_2$;
   b) adding a titanium dioxide starting material to the solution of step a);
   c) adjusting the pH of the solution between 4 and 7 to obtain precipitation of rutile $TiO_2$; and
   d) filtering and drying the precipitation formed in step c).

9. The method of claim 8, wherein said silicon compound comprises a water-soluble silicate.

10. The method according to claim 8, wherein the titanium dioxide starting material comprises titanium oxychloride.

* * * * *